United States Patent [19]
Maxwell et al.

[11] Patent Number: 5,564,852
[45] Date of Patent: Oct. 15, 1996

[54] ADJUSTABLE HOT STICK ADAPTOR

[75] Inventors: Henry A. Maxwell; Michael F. Brunelli, both of Auburn; Gordon L. Steltzer, New Boston, all of N.H.

[73] Assignee: Burndy Corporation, Norwalk, Conn.

[21] Appl. No.: 412,768

[22] Filed: Mar. 29, 1995

[51] Int. Cl.$^6$ .............................. F16C 11/00; F16D 1/12; F16B 7/10; B25B 23/16
[52] U.S. Cl. ............................. 403/97; 403/54; 403/84; 403/171; 403/176; 81/53.1; 81/53.11; 81/DIG. 1
[58] Field of Search ................................ 403/54, 64, 83, 403/84, 91, 97, 98, 99, 101, 171, 176; 81/53.1, 57.22, 57.26, 57.29, 53.11, DIG. 1

[56] References Cited

U.S. PATENT DOCUMENTS

| | | |
|---|---|---|
| 869,836 | 10/1907 | Gaynor . |
| 1,920,168 | 8/1933 | Bodendieck . |
| 2,643,281 | 6/1953 | Bott . |
| 3,111,049 | 11/1963 | Brehmer . |
| 3,205,522 | 9/1965 | Then ................................. 403/97 X |
| 3,799,599 | 3/1974 | Jordan ................................. 294/20 |
| 3,922,481 | 11/1975 | Lewis ................................. 403/97 X |
| 4,447,170 | 5/1984 | Helmes ................................. 403/97 X |
| 4,470,328 | 9/1984 | Landis ................................. 81/53.1 |
| 4,986,016 | 1/1991 | Wichman ................................. 403/176 X |

FOREIGN PATENT DOCUMENTS 787679   12/1957   United Kingdom ................... 403/176

*Primary Examiner*—Blair Johnson
*Assistant Examiner*—Bruce A. Lev
*Attorney, Agent, or Firm*—Perman & Green

[57] ABSTRACT

The hot stick adaptor has two members that are adjustably movable relative to each other. A first one of the members has two separate first ratchet areas. A second one of the members has three separate second ratchet ares. A fastener and spring connect the two members to each other with one of the first ratchet areas and one of the second ratchet areas in interlocking engagement. The two members can be moved away from each other in a first direction, compressing the spring, to disengage the interlocking engagement and thereby allow the two members to be moved in a second direction.

11 Claims, 2 Drawing Sheets

ADJUSTABLE HOT STICK ADAPTOR

BACKGROUND OF THE INVENTION

1. Field of the Invention

The present invention relates to adjustable connectors and, more particularly, to an adaptor for an electrical hot stick.

2. Prior Art

Adapters for adjustably connecting a tool to an end of a hot stick are well known in the art. AMP Corporation sells 90° adapters with two separate ratchet areas offset 90° from each other. AMP Corporation also sells a combination "c" and wedge holder with a spring loaded joint. The following U.S. Patents show different types of adjustable hot stick connections: U.S. Pat. Nos. 1,920,168; 3,111,049; 4,470,328; 869,836; 2,643,281; and 3,799,599.

SUMMARY OF THE INVENTION

In accordance with one embodiment of the present invention a hot stick adaptor is provided comprising a first member, a second member, and means for adjustably moving the second member relative to the first member. The first member has two separate first ratchet areas. The second member has three separate second ratchet areas. One of the first ratchet areas and one of the second ratchet areas are matingly connected to each other. The means for adjustably moving comprises a spring connected to and biasing the first and second members towards each other.

In accordance with another embodiment of the present invention a hot stick adaptor is provided comprising a first member, a second member and a spring. The first member has a first interlock mating area. The second member has at least three separate second interlock mating areas. The spring is connected to the first and second members and biases the first interlock mating area and one of the second interlock mating areas towards each other and into interlocking engagement. The first and second members can be moved relative to each other in a first direction, deforming the spring, to disengage the interlocking engagement and allow further movement of the first and second members relative to each other in a second direction.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figure 1:
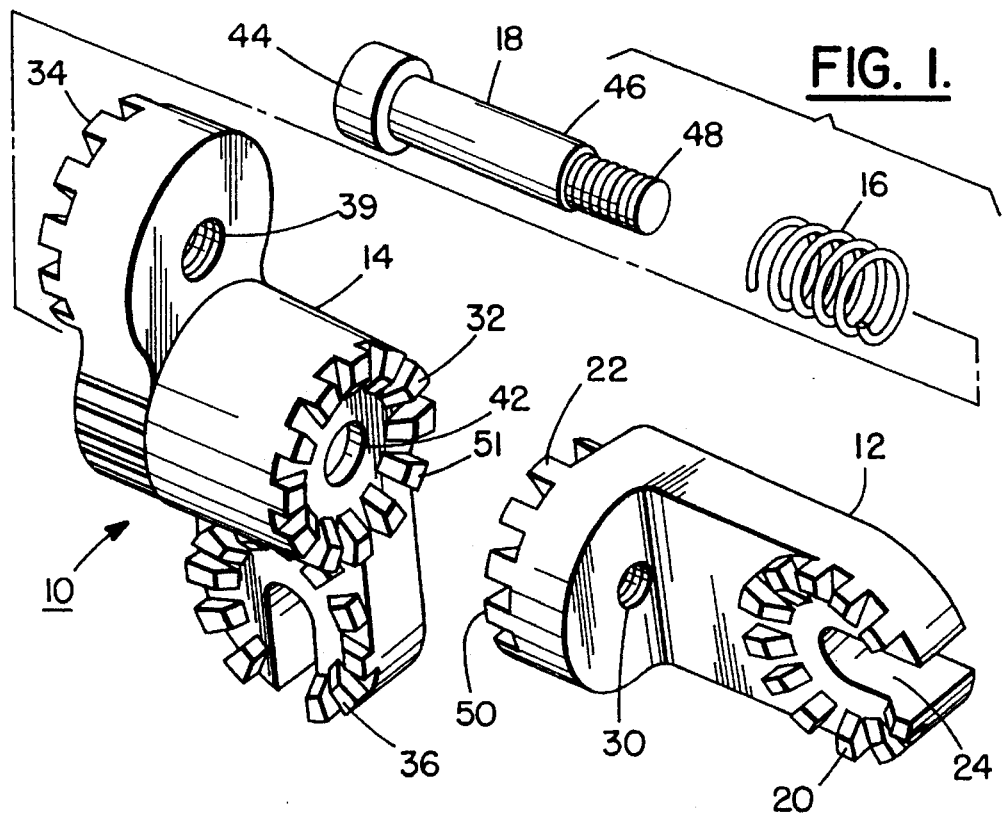
FIG. 1 is an exploded perspective view of an adjustable hot stick adaptor incorporating features of the present invention.

Referring to FIG. 1, there is shown an exploded perspective view of an adaptor 10 incorporating features of the present invention. Although the present invention will be described with reference to the single embodiment shown in the drawings, it should be understood that the present invention can be embodied in various different types and kinds of alternate embodiments. In addition, any suitable size, shape, or type of elements or materials could be used.

The adaptor 10 generally comprises a first member 12, a second member 14, a spring 16, and a fastener 18. In alternate embodiments, fewer and more elements may be provided. The first member 12 has a general "L" shape with two first ratchet areas 20, 22. Ratchet area 20 is suitably sized and shaped and is provided with a slot 24 for attachment to an end 26 of a universal hot stick 28 (see FIG. 3) or the tool 29 (see 29 in FIG. 2). The other first ratchet area 22 is 90° offset from ratchet area 20. The other first ratchet area 22 has a threaded hole 30 in its center.

Figure 2:
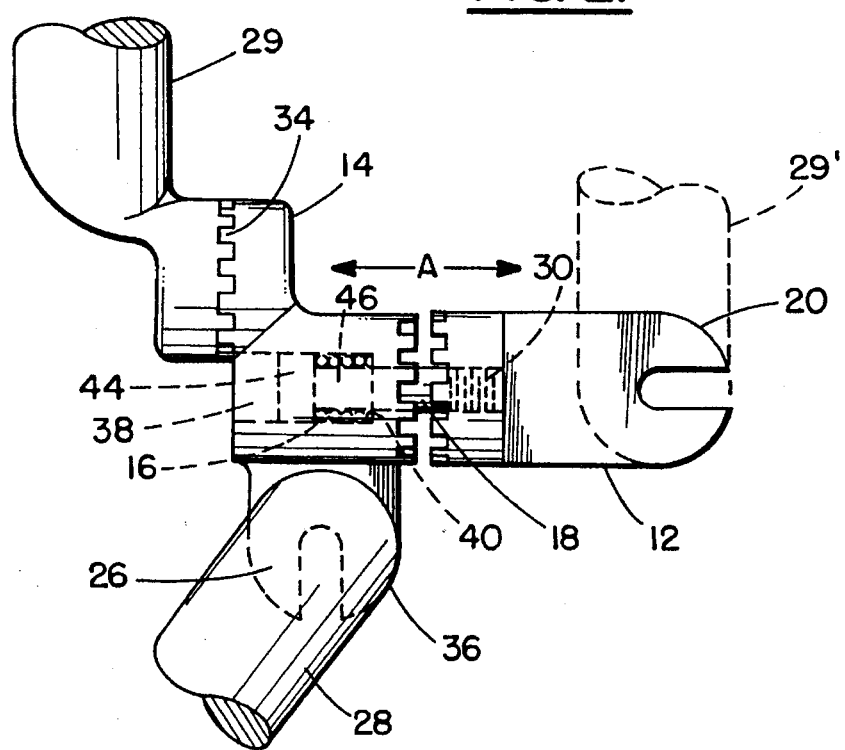
FIG. 2 is an elevation front view of the adaptor shown in FIG. 1 connected to a hot stick and a tool, and shown in an expanded position.
Figure 3:
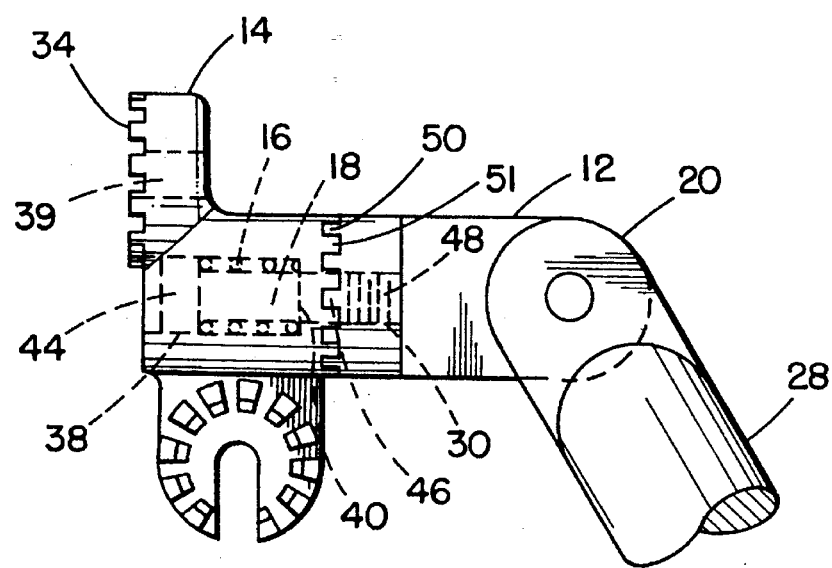
FIG. 3 is a front elevation view of the adaptor shown in FIG. 1 in an interlocking engagement position and having the hot stick connected thereto at a different position than shown in FIG. 2.

The second member 14 has three second ratchet areas 32, 34, 36. Two of these second ratchet areas 32, 34 are offset 180° from each other. As seen in FIGS. 1 and 2, the area 32 has a center axis that extends through the aperture 42 and below the center axis of the area 34. The center axis of the area 34 extends through the channel 39. Therefore, the center axis of the area 32 is offset from the center axis of the area 34. The third of these second ratchet areas 36 is offset 90° from the other two 32, 34. The area 36 has a center axis that extends through the center hole in the area 36. Thus, the three areas 32, 34, 36 each have a center axis offset from one another. A channel 38 (see FIG. 2) is provided in the second member 14 with a ledge 40 and an aperture 42 at the second ratchet area 32. The ratchet areas 34, 36 are each adapted to have a tool 29 (see FIG. 2) adjustably connected thereto with the aid of a suitable fastener (not shown). Another channel 39 is provided at the ratchet area 34. The channel 39 has fastener screw threads therein. The fastener 18 has an enlarged head 44 at one end, a shaft section 46, and a threaded section 48 at the other end. Referring also to FIGS. 2 and 3, the shaft section 46 passes through the channel 38 and hole 42. The head 44 is located in the channel 38. The threaded end 48 is screwed into the threaded hole 30 of the first member 12. This stationarily fixes the fastener 18 to the first member 12. The spring 16 is a coil spring that is located around the shaft section 46 of the fastener 18. The coil spring 16 is located in the channel 38. The enlarged head 44 of the fastener 18 and the ledge 40 of the second member 14 sandwich the spring 16 therebetween.

FIG. 3 shows when the teeth 50 of the ratchet area 22 and the teeth 51 of ratchet area 32 are in interlocking engagement. In this interlocking engagement position, the second member 14 is prevented from axially rotating relative to the first member 12. However, as seen with reference to FIG. 2, a user can longitudinally move the two members 12, 14 apart as indicated by arrows A. The spring 16 is compressed between the head 44 and the ledge 40 during this movement. This moves the teeth 50, 51 out of their interlocking engagement. The user can now axially rotate the two members 12, 14 relative to each other. When rotated to the desired position, the user can release the tensile force being applied to the two members 12, 14. The spring will then bias the two members 12, 14 back together with the teeth 50, 51 once again returning to their interlocking engagement. FIG. 3 also illustrates that the hot stick 28 can be connected to the ratchet area 20. The hot stick 28 could alternatively be connected to ratchet area 34. The tool 29 can be located at any one of the remaining ratchet areas 20, 34 or 36 as illustrated by tool 29' in FIG. 2. Thus, the hot stick 28 can be located at any one of the three ratchet areas 20, 34 or 36. The tool 29 can be located at any one of the remaining ratchet areas 20, 34 or 36.

The adaptor 10 allows a high amount of adjustability between the hot stick 28 and the tool 29. The hot stick 28 can be alternatively located at numerous angular positions on any of the ratchet areas 20, 34 or 36. The tool 29 can be alternatively located at any one of the remaining two ratchet areas. The tool 29 can also be located at numerous angular positions on each of the ratchet areas 20, 34, 36. The adaptor 10 also allows the two members 12, 14 to be readily and easily angularly repositioned relative to each other for quick adjustments with the spring loaded ratchet system.

In alternate embodiments, connection systems other than the ratchet areas could be used. The second member 14 could have more than three second ratchet areas and, they could be at different angles to each other than described above. The coil spring 16 could be replaced with a different type of biasing means. The fastener 18 could be replaced with a different type of fastener. The first member 12 could have an integral shaft extending from its ratchet area 22 with the fastener merely being a nut that is screwed onto the end of that shaft. The spring loaded ratchet system could also be reversed with the first member 12 having the channel therein.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A hot stick adaptor comprising:

a first member having two separate first ratchet areas;

a second member having three separate second ratchet areas, wherein two of the second ratchet areas are offset 180° from each other and have offset center axes, and another one of the second ratchet areas is offset 90° from the two other second ratchet areas, one of the first ratchet areas and one of the second ratchet areas being matingly connected to each other; and means for adjustably moving the second member relative to the first member, the means for adjustably moving comprising a spring connected to and biasing the first and second members towards each other.

2. An adaptor as in claim 1 wherein the two separate first ratchet areas are offset 90° from each other.

3. An adaptor as in claim 1 wherein the means for adjustably moving the second member relative to the first member comprises a fastener stationarily connected to one of the members and extending into a channel of the other member.

4. An adaptor as in claim 3 wherein the spring is a coil spring located in the channel and having ends sandwiched between a portion of the fastener and a ledge in the channel.

5. A hot stick adaptor comprising:

a first member with at least two first interlock mating areas;

a second member with at least three separate second interlock mating ratchet areas, the three second interlock mating areas each having a center axis, the center axes all being offset from one another; and a spring connected to the first and second members biasing one of the first interlock mating areas and one of the second interlock mating areas towards each other and into interlocking engagement, wherein the first and second members can be moved relative to each other in a first direction, deforming the spring, to disengage the interlocking engagement and allow further movement of the first and second members relative to each other in a second direction.

6. An adaptor as in claim 5 wherein the two separate first interlock mating areas are offset 90° from each other.

7. An adaptor as in claim 5 wherein two of the second interlock mating areas are offset 180° from each other.

8. An adaptor as in claim 7 wherein another one of the second interlock mating areas is offset 90° from the two second interlock mating areas.

9. An adaptor as in claim 8 wherein the spring is a coil spring located in the channel and having ends sandwiched between a portion of the fastener and a ledge in the channel.

10. An adaptor as in claim 5 further comprising a fastener stationarily connected to one of the members and extending into a channel of the other member, the other member being movable on the fastener.

11. A hot stick and adaptor assembly comprising:

a hot stick; and an adaptor movably connected to the hot stick, the adaptor having:

a) a first member having two separate first ratchet areas;

b) a second member having three separate second ratchet areas, wherein two of the second ratchet areas are offset 180 degrees from each other and have offset center axes, and another one of the second ratchet areas is offset 90 degrees from the two other second ratchet areas, one of the first ratchet areas and one of the second ratchet areas being matingly connected to each other; and c) means for adjustably moving the second member relative to the first member, the means for adjustably moving comprising a spring connected to and biasing the first and second members towards each other.

* * * * *